(No Model.)
W. J. BARNDOLLAR.
BRIDLE BIT.
No. 488,051. Patented Dec. 13, 1892.
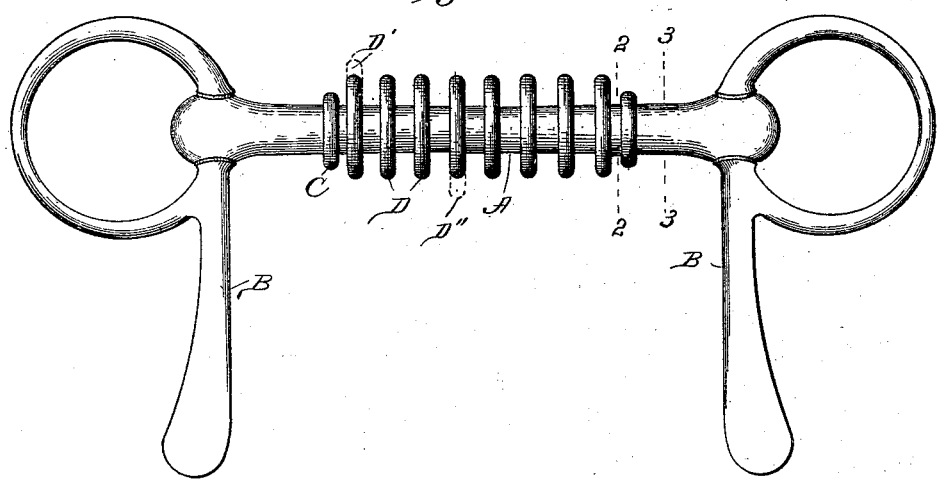
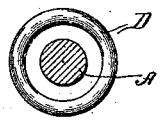
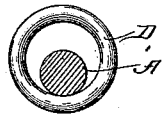
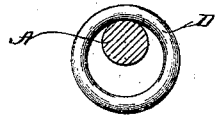
Witnesses:
Harry S. Rohrer
E. N. Berry
Inventor:
W. J. Barndollar.
By W. H. Lamar,
Attorney

UNITED STATES PATENT OFFICE.

WINFIELD J. BARNDOLLAR, OF PUEBLO, COLORADO.

BRIDLE-BIT.

SPECIFICATION forming part of Letters Patent No. 488,051, dated December 13, 1892.

Application filed July 6, 1892. Serial No. 439,111. (No model.)

*To all whom it may concern:*

Be it known that I, WINFIELD J. BARNDOLLAR, a native-born citizen of the United States, residing at Pueblo, in the county of Pueblo and State of Colorado, have invented certain new and useful Improvements in Bridle-Bits; and I do hereby declare the following to be a full, clear, and exact description of the invention, such as will enable others skilled in the art to which it appertains to make and use the same.

The object of this invention is to prevent horses from habitually protruding their tongues while being ridden or driven.

In the drawings, Figure 1 shows the complete bit. Fig. 2 is a section on the line 2 2, Fig. 1. Fig. 3 is a section on the line 3 3, Fig. 1. Figs. 4 and 5 illustrate different positions of certain rings hereinafter described.

The figures show a common bit provided with cheek-pieces and rings or loops for the attachment of straps.

Upon the bar A of the bit, which may or may not be jointed, are loose rings D, of an internal diameter greater than the diameter of the bar. These are retained upon the middle part of the bar by rings C, shrunk upon or otherwise fixed to the bar at a little distance from the cheek-pieces B. Like rings (not shown) may, if desired, be placed between the rings D to confine each alone to a short segment of the bar between two fixed rings. Now the loose rings, if not externally supported, fall so that they hang upon the bar in the position illustrated in Fig. 5; but if the tongue of the animal be beneath them they are thereby raised to the position of Figs. 1 and 2 or to that of Fig. 4, the latter being the upper limit of their motion. These simple devices, while not depriving the animal of the power to move his tongue freely as he may desire, yet completely prevent his acquiring or persisting in the habit of protruding the tongue, and, further, they incidentally prevent "taking the bit in the teeth." Why the animal refrains from protruding the tongue, as is perhaps his wont, it may not be easy to say with certainty. Possibly moving the tongue to one side allows the rings to fall upon the floor of the mouth, producing a disagreeable or at least an unusual sensation and causing the instant replacement of the member. Be that as it may, it is certain that the devices are in some way perfectly effective in inducing the animal to keep the tongue in the mouth. But for the rings C the rings D might cause annoyance by passing outward toward the cheek-pieces, where the normal distance between the jaws is less than the diameter of the rings.

The rings may be placed upon the bit at the time of manufacture or they may be added to a common bit at any time without detaching its parts. For the latter purpose untempered wire of suitable diameter is formed into open rings to be passed laterally over the bar of the bit and closed. The natural rigidity of the metal is sufficient to prevent their reopening while in use.

What I claim is—

1. A bridle-bit having a bit-bar loosely encircled by a series of unconnected rings whose internal diameter is materially greater than that of the bar.

2. The combination, with the bar of a bit, of rings placed upon the middle portion of the bar and having an internal diameter greater than the bar's diameter and rings fixed to the bar near its ends to prevent the rings first named from passing to the ends of the bar.

In testimony whereof I affix my signature in presence of two witnesses.

WINFIELD J. BARNDOLLAR.

Witnesses:
 JOHN R. DIXON,
 JESSE J. CHAPPEL.